United States Patent
Yamazaki et al.

(10) Patent No.: US 10,363,972 B2
(45) Date of Patent: Jul. 30, 2019

(54) VEHICLE REINFORCING MEMBER AND VEHICLE

(71) Applicant: YAMAHA HATSUDOKI KABUSHIKI KAISHA, Iwata-shi, Shizuoka (JP)

(72) Inventors: Yutaka Yamazaki, Shizuoka (JP); Toshiaki Kamo, Shizuoka (JP); Toyoji Harada, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 83 days.

(21) Appl. No.: 15/792,799

(22) Filed: Oct. 25, 2017

(65) Prior Publication Data

US 2018/0134321 A1 May 17, 2018

(30) Foreign Application Priority Data

Nov. 14, 2016 (JP) ................................ 2016-221907

(51) Int. Cl.
*B62D 25/08* (2006.01)
*B60G 13/00* (2006.01)
(Continued)

(52) U.S. Cl.
CPC ......... *B62D 25/088* (2013.01); *B60G 13/003* (2013.01); *B60G 21/0553* (2013.01);
(Continued)

(58) Field of Classification Search
CPC ...... B62D 25/088; B62D 21/15; B62D 27/04; B62D 25/085; B62D 21/02; B62D 21/16;
(Continued)

(56) References Cited

U.S. PATENT DOCUMENTS 3,103,993 A * 9/1963 Gies .......................... F16F 9/42
188/274
5,810,128 A * 9/1998 Eriksson .................. F16F 9/342
188/285
(Continued)

FOREIGN PATENT DOCUMENTS

JP 2002-181114 A 6/2002
JP 2002-211437 A 7/2002
(Continued)

OTHER PUBLICATIONS

Official Communication issued in corresponding European Patent Application No. 17201596.8, dated Apr. 19, 2018.

*Primary Examiner* — Drew J Brown
(74) *Attorney, Agent, or Firm* — Keating and Bennett, LLP

(57) ABSTRACT

A vehicle reinforcing member includes first and second pistons movable in an axial direction in a cylinder. An inside of the cylinder is sectioned into a gas chamber and a main liquid chamber by the first piston, and the main liquid chamber is sectioned into a first sub-liquid chamber and a second sub-liquid chamber by the second piston. Gas is sealed in the gas chamber, and liquid is sealed in the first and second sub-liquid chambers. A piston rod is coupled to the second piston. The cylinder and the piston rod are respectively coupled to two locations of a vehicle body. A communication path connects the first sub-liquid chamber to the second sub-liquid chamber. A moving amount of the liquid in the communication path is adjusted by an adjuster such that a moving load through the second piston is adjusted.

8 Claims, 11 Drawing Sheets

(51) Int. Cl.

| | | |
|---|---|---|
| *B60G 21/055* | (2006.01) | |
| *F16F 9/02* | (2006.01) | |
| *B62D 27/04* | (2006.01) | |
| *B60G 21/073* | (2006.01) | |
| *B62D 21/15* | (2006.01) | |
| *F16F 9/46* | (2006.01) | |
| *F16F 9/26* | (2006.01) | |
| *B62D 21/16* | (2006.01) | |
| *B62D 21/02* | (2006.01) | |
| *F16F 9/06* | (2006.01) | |

(52) U.S. Cl.
CPC .......... *B60G 21/073* (2013.01); *B62D 21/15* (2013.01); *B62D 25/085* (2013.01); *B62D 27/04* (2013.01); *F16F 9/0272* (2013.01); *F16F 9/466* (2013.01); *B60G 2204/128* (2013.01); *B60G 2206/014* (2013.01); *B62D 21/02* (2013.01); *B62D 21/16* (2013.01); *F16F 9/063* (2013.01); *F16F 9/26* (2013.01)

(58) Field of Classification Search
CPC .. F16F 9/26; F16F 9/466; F16F 9/0272; F16F 9/063; B60G 2204/128; B60G 21/073; B60G 13/003; B60G 21/0553; B60G 2206/014

See application file for complete search history.

(56) References Cited

U.S. PATENT DOCUMENTS

| | | | | |
|---|---|---|---|---|
| 6,595,533 | B2 * | 7/2003 | Sawai | B62D 25/082 |
| | | | | 280/124.108 |
| 7,604,247 | B2 * | 10/2009 | Kondou | B60G 99/00 |
| | | | | 280/124.108 |
| 7,845,661 | B2 * | 12/2010 | Kondou | B62D 25/2036 |
| | | | | 280/124.108 |
| 9,802,457 | B2 * | 10/2017 | Yamazaki | B60G 21/073 |
| 2002/0056969 | A1 | 5/2002 | Sawai et al. | |
| 2004/0061266 | A1 * | 4/2004 | Riel | F16F 9/0272 |
| | | | | 267/124 |
| 2016/0339758 | A1 | 11/2016 | Yamazaki et al. | |
| 2017/0058987 | A1 * | 3/2017 | Nakano | F16F 9/34 |
| 2017/0120716 | A1 * | 5/2017 | Sakai | B60G 13/08 |

FOREIGN PATENT DOCUMENTS

| | | |
|---|---|---|
| JP | 2003-252240 A | 9/2003 |
| WO | 2015/104929 A1 | 7/2015 |

* cited by examiner

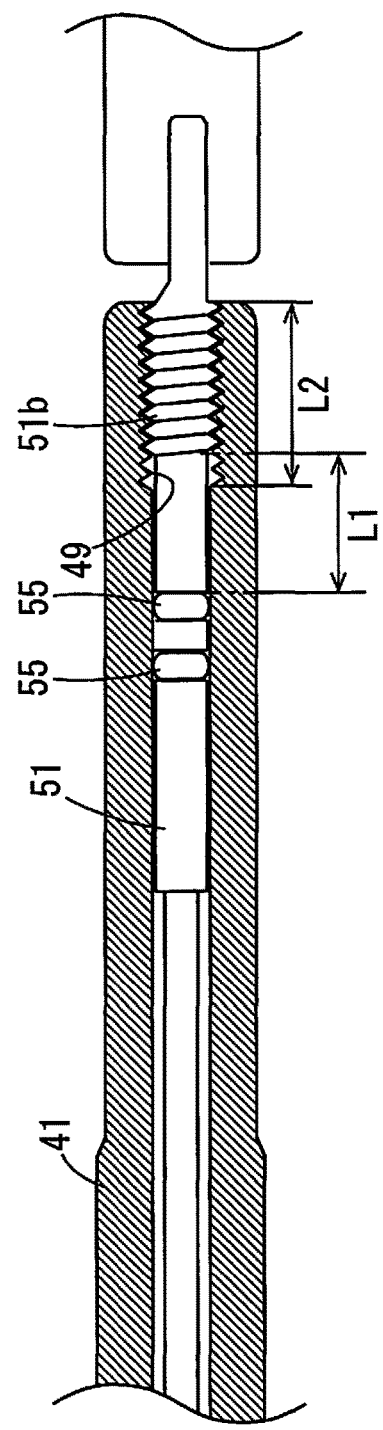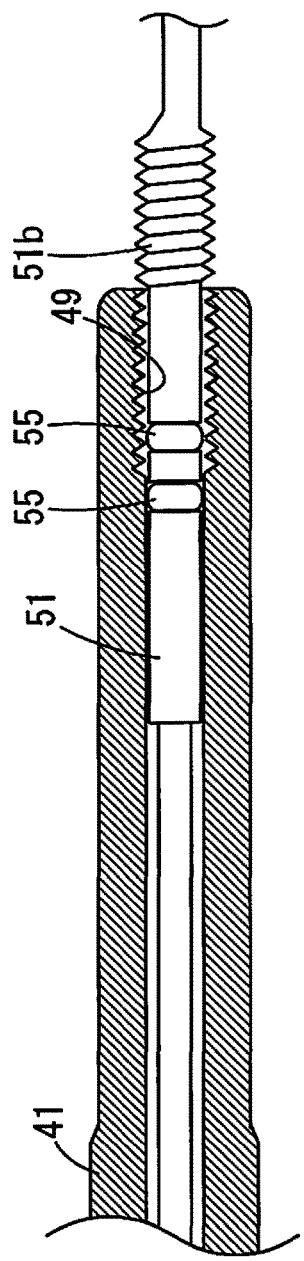
FIG. 11A
FIG. 11B

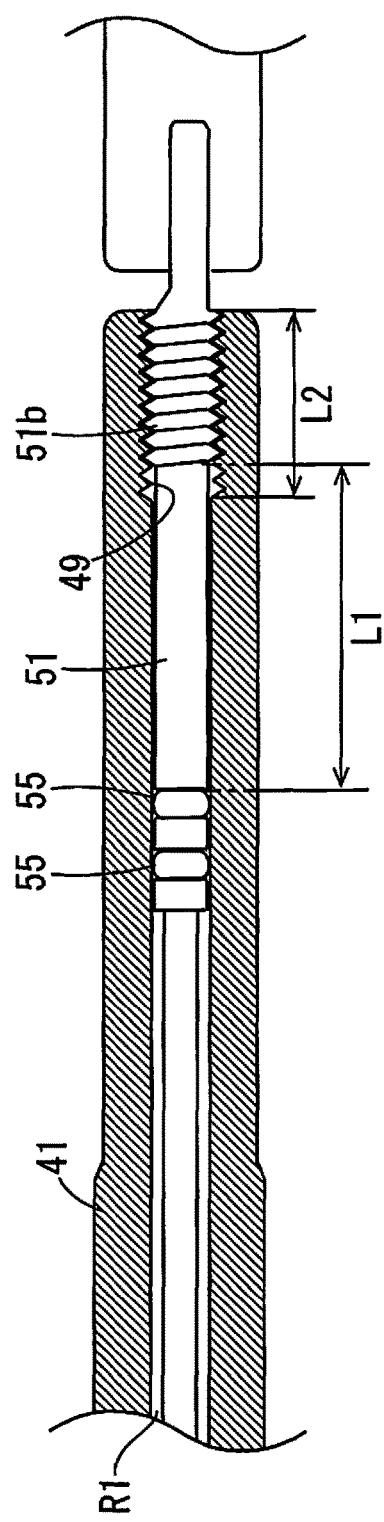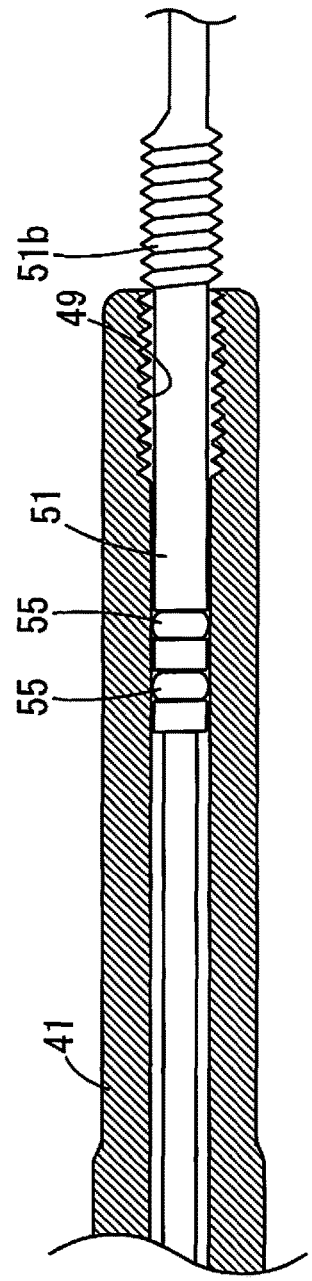
FIG. 12A
FIG. 12B

VEHICLE REINFORCING MEMBER AND VEHICLE

CROSS REFERENCE TO RELATED APPLICATIONS

This application claims the benefit of priority to Japanese Patent Application No. 2016-221907 filed on Nov. 14, 2016. The entire contents of this application are hereby incorporated herein by reference.

BACKGROUND OF THE INVENTION

1. Field of the Invention

The present invention relates to a vehicle reinforcing member and a vehicle including the vehicle reinforcing member.

2. Description of Related Art

When a vehicle travels, subtle deformation and vibration occur in a vehicle body of the vehicle. In order to inhibit such deformation and vibration of the vehicle body, it has been suggested that a damper be provided at a main part of the vehicle body. A reinforcing member described in JP 2002-211437 A is provided to couple left and right wall portions of a vehicle body to each other. This reinforcing member functions as a hydraulic damper and inhibits deformation and vibration of the vehicle body by a viscous damping force. However, damping forces required to inhibit deformation and vibration differ depending on sizes and shapes of vehicle bodies. Further, the required damping forces differ depending on the environments in which the vehicles are used, such as road surface conditions. The reinforcing member of JP 2002-211437 A cannot adjust a damping force. Therefore, it is necessary that different reinforcing members are prepared according to different vehicle bodies and environments. Thus, a reinforcing member having high flexibility is required.

SUMMARY OF THE INVENTION

Preferred embodiments of the present invention provide vehicle reinforcing members that are able to adjust a damping force and have high flexibility, and vehicles including the vehicle reinforcing members.

A vehicle reinforcing member according to a preferred embodiment of the present invention includes a cylinder, a first piston that sections an inside of the cylinder into a gas chamber and a main liquid chamber and is movable in an axial direction in the cylinder, a second piston that sections the main liquid chamber into a first sub-liquid chamber and a second sub-liquid chamber and is movable in the main liquid chamber in the axial direction of the cylinder, a piston rod coupled to the second piston and extending to an outside of the cylinder through the second sub-liquid chamber, and an adjuster that adjusts a moving load through the second piston in the main liquid chamber, wherein gas is sealed in the gas chamber, and liquid is sealed in the first and second sub-liquid chambers, the piston rod is coupled to one of two locations on the vehicle body, the cylinder is coupled to another one of the two locations on the vehicle body, at least one of the second piston and the piston rod includes a communication path that connects the first sub-liquid chamber to the second sub-liquid chamber, and the adjuster adjusts the moving load by adjusting a moving amount of liquid in the communication path.

In the vehicle reinforcing member, the inside of the cylinder is sectioned into the gas chamber and the main liquid chamber by the first piston, and the main liquid chamber is sectioned into the first sub-liquid chamber and the second sub-liquid chamber by the second piston. The gas is sealed in the gas chamber, and the liquid is sealed in the first and second sub-liquid chambers. The first sub-liquid chamber and the second sub-liquid chamber communicate with each other through the communication path provided in at least one of the second piston and the piston rod. The piston rod is coupled to the second piston, and the piston rod is coupled to one of the two locations on the vehicle body. Further, the cylinder is coupled to the other location of the two locations on the vehicle body.

The force in the axial direction is exerted on the second piston in the cylinder by displacement of the two locations on the vehicle body or vibration. Thus, the second piston is moved in the axial direction in the cylinder, and liquid flows between the first sub-liquid chamber and the second sub-liquid chamber through the communication path. In this case, a damping force is generated by a flow of the liquid, and displacement of the two locations on the vehicle body and vibration are significantly reduced or prevented. Further, the first piston is moved in the axial direction while receiving the pressure of the gas in the gas chamber. Thus, a pressure difference between the first sub-liquid chamber and the second sub-liquid chamber is reduced, and an occurrence of cavitation is significantly reduced or prevented.

The moving amount of the liquid in the communication path is adjusted by the adjuster, so that the moving load through the second piston is adjusted. Thus, a damping force of the vehicle reinforcing member is able to be adjusted to be suitable for a size of the vehicle body and the environment in which the vehicle is used. Therefore, flexibility of the vehicle reinforcing member is enhanced.

The adjuster preferably adjusts a moving amount of the liquid in the communication path by changing a cross sectional area through which the liquid passes in the communication path. In this case, the damping force of the vehicle reinforcing member is adjusted with a simple structure.

The adjuster preferably includes a moving member including an insertion portion that is insertable into the communication path, and a driver that moves the moving member, and the driver preferably changes the cross sectional area through which the liquid passes in the communication path by changing a relative positional relationship between the communication path and the insertion portion by movement of the moving member.

In this case, when the moving member is moved by the driver, a relative positional relationship between the communication path and the insertion portion is changed. Thus, a cross sectional area through which the liquid passes in the communication path is changed. Thus, a moving amount of the liquid in the communication path is adjusted. Therefore, the damping force of the vehicle reinforcing member is adjusted with a simple structure.

A through hole extending in the axial direction is provided in the second piston, and the piston rod includes a rod inserted into the through hole of the second piston, and a cap nut. In the rod, a movement path preferably extends in the axial direction, and a communication opening connects the movement path to the second sub-liquid chamber, one end of the rod projects into the first sub-liquid chamber, the cap nut is attached to the one end of the rod, a communication hole connects the first sub-liquid chamber to the movement path of the rod in the cap nut, the moving member includes an adjusting rod inserted into the movement path of the rod to be movable, a tip end of the adjusting rod is able be positioned inside of the cap nut as the insertion portion, the communication path preferably includes the communication hole of the cap nut, a clearance between an inner surface of the rod and an outer surface of the adjusting rod, and a communication opening of the rod, and the driver preferably changes a positional relationship between the communication hole of the cap nut and the insertion portion by moving the adjusting rod relative to the rod.

In this case, due to the movement of the second piston, the liquid flows between the first sub-liquid chamber and the second sub-liquid chamber through the communication hole of the cap nut, the clearance between the inner surface of the rod and the outer surface of the adjusting rod, and the communication opening of the rod. When the adjusting rod is moved by the driver relative to the rod, a positional relationship between the insertion portion of the adjusting rod and the communication hole of the cap nut is changed. Thus, the cross sectional area through which the liquid passes in the communication path is changed, and the moving amount of the liquid in the communication path is adjusted.

In this manner, the communication hole is provided in the cap nut, and the adjusting rod inserted into the movement path of the rod is moved. Thus, the moving amount of the liquid in the communication path is adjusted. Therefore, a damping force of the vehicle reinforcing member is adjusted with a simple and compact structure.

The insertion portion preferably has a tapered shape. In this case, a cross sectional area through which the liquid passes is gradually changed due to the movement of the adjusting rod. Thus, a moving amount of the liquid in the communication path is finely adjusted.

The movement path of the rod and the adjusting rod preferably each have a circular or substantially circular cross section, and the driver includes a first screw thread provided on an outer surface of the adjusting rod, a second screw thread provided on an inner surface of the rod to engage with the first screw thread, and a rotator that rotates the adjusting rod and moves the adjusting rod in the movement path of the rod.

In this case, when the adjusting rod is rotated by the rotator, the adjusting rod is moved in the axial direction with respect to the rod. Thus, the cross sectional area through which the liquid passes is changed with a simple structure.

The rod is preferably cylindrical or substantially cylindrical and extends in the axial direction, the adjusting rod preferably includes a projecting end that projects from another end of the piston rod, and the rotator is attached to the projecting end of the adjusting rod. In this case, the rotator is easily attached to the adjusting rod.

The vehicle reinforcing member preferably further includes a biasing member that biases the second piston in one direction of the axial direction. In this case, the second piston is reliably held at an appropriate position by the biasing member.

The vehicle reinforcing member preferably further includes a first coupling that couples the piston rod to one of the two locations on the vehicle body, wherein the first coupling includes an attachment portion attached to a portion of an outer surface of the piston rod outside of the cylinder, and a first extending portion that is offset from an extending line of an axial center of the piston rod and extends in the axial direction.

In this case, the piston rod is easily coupled to the vehicle body by the first coupling. Further, because the first coupling is offset from the extending line of the axial center of the piston rod, a space is provided on the extending line of the piston rod. The structure of the adjuster is simplified by using this space.

The vehicle reinforcing member further includes a second coupling that couples the cylinder to another location of the two locations on the vehicle body, wherein the second coupling includes a second extending portion that extends in the axial direction and on an extending line of the piston rod. In this case, the cylinder is easily coupled to the vehicle body by the second coupling.

A vehicle according to a preferred embodiment of the present invention includes a vehicle body, and the above-described vehicle reinforcing member attached between the two locations on the vehicle body.

In the vehicle, the above-described vehicle reinforcing member is used so that deformation and vibration of the vehicle body is significantly reduced or prevented. Further, because a damping force of the vehicle reinforcing member is able to be adjusted, travel stability is enhanced in various vehicles and various environments.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 11A and 11B are diagrams for explaining a distance between a seal and a screw thread.

FIGS. 12A and 12B are diagrams for explaining the distance between the seal and the screw thread.

DETAILED DESCRIPTION OF THE PREFERRED EMBODIMENTS

Vehicle reinforcing members and vehicles according to preferred embodiments of the present invention will be described below with reference to drawings. In the following preferred embodiments, the vehicle reinforcing members are described with respect to a four-wheeled automobile that is an example of the vehicle.

Figure 1:
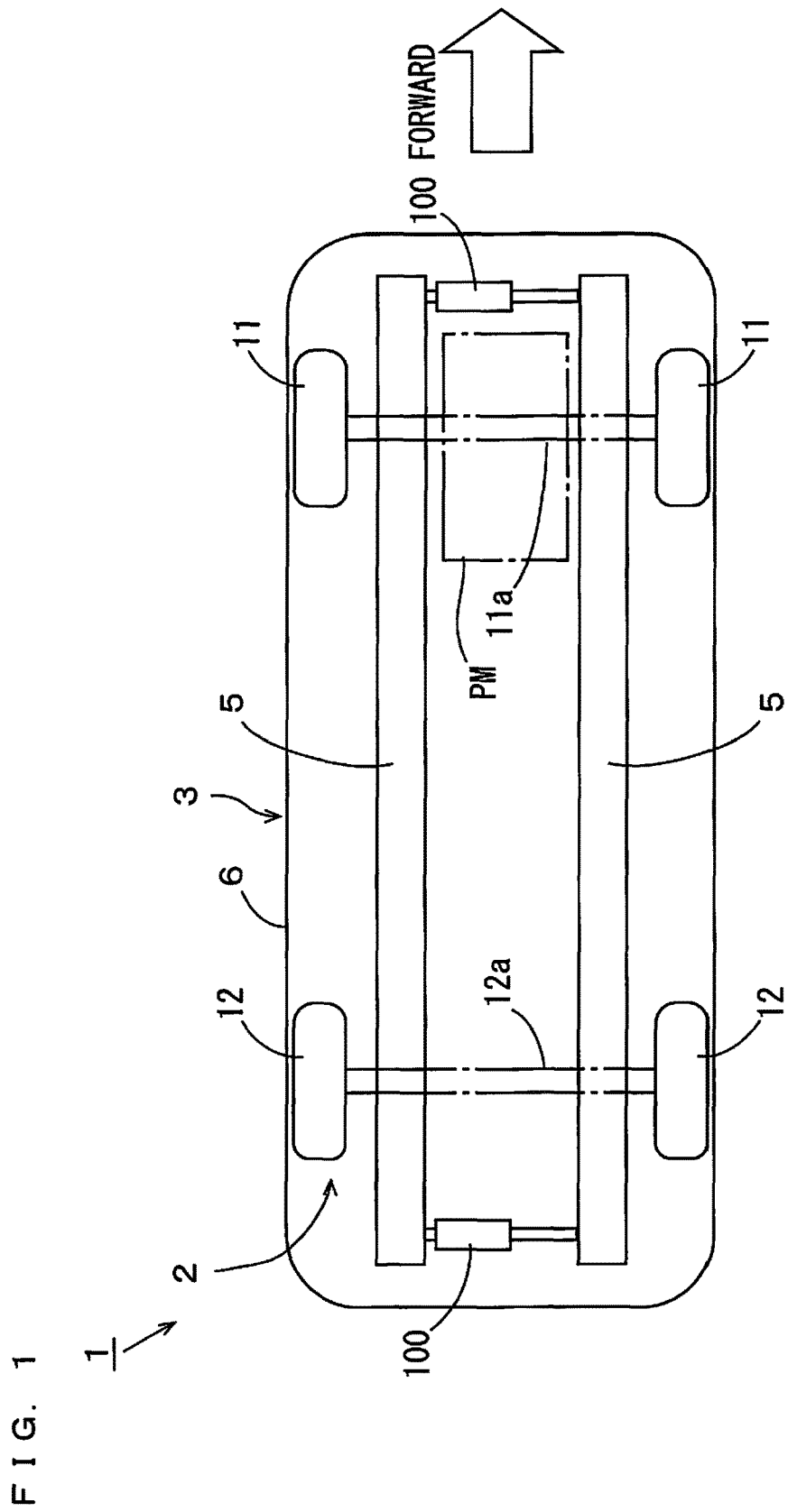
FIG. 1 is a schematic diagram for explaining a vehicle including a vehicle reinforcing member according to a preferred embodiment of the present invention.

FIG. 1 is a schematic diagram for explaining the vehicle including the vehicle reinforcing member according to a preferred embodiment of the present invention. As shown in FIG. 1, the vehicle 1 includes a motor PM, a chassis 2, and a vehicle body 3. The motor PM is preferably an engine, for example, and generates power to make the vehicle 1 to travel. The chassis 2 mainly includes elements to which the power generated by the motor PM is transmitted. Specifically, the chassis 2 includes a pair of left and right front wheels 11, a pair of left and right rear wheels 12, axles 11a, 12a, and a pair of left and right suspensions (not shown). The pair of front wheels 11 are provided at one end and the other end of the axle 11a, and the pair of rear wheels 12 are provided at one end and the other end of the axle 12a.

The vehicle body 3 is supported by the chassis 2. The vehicle body 3 mainly includes elements to which the power generated by the motor PM is not transmitted. Specifically, the vehicle body 3 includes a pair of left and right main frames 5 and an outer frame 6. The pair of respective main frames 5 extend in a vehicle front-and-rear direction. A left front wheel 11 and a left rear wheel 12 are respectively coupled to a left main frame 5 via a suspension (not shown), and a right front wheel 11 and a right rear wheel 12 are respectively coupled to a right main frame 5 via a suspension (not shown). The outer frame 6 is integrally provided with the left and right main frames 5. The outer frame 6 preferably includes a bonnet, a roof, a bumper and the like and defines an outer shape of the vehicle.

The reinforcing member 100 is provided between predetermined two locations on the vehicle body 3. In the present example, a pair of reinforcing members 100 couple the pair of main frames 5 to each other. One reinforcing member 100 couples front ends of the pair of main frames 5, and the other reinforcing member 100 couples rear ends of the pair of main frames 5 to each other.

Figure 2:
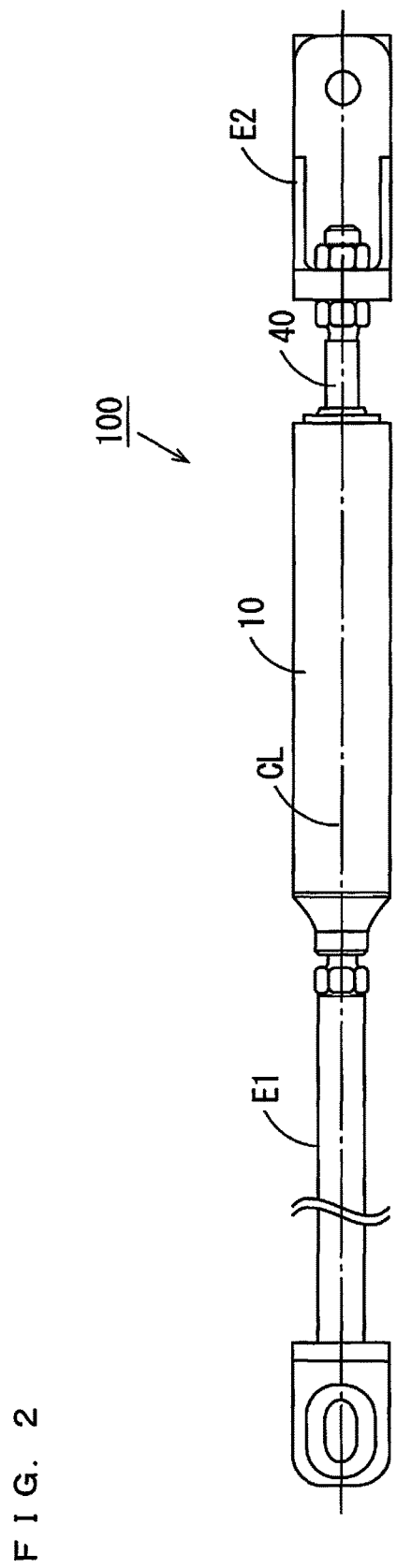
FIG. 2 is a diagram showing the appearance of a reinforcing member.
Figure 3:
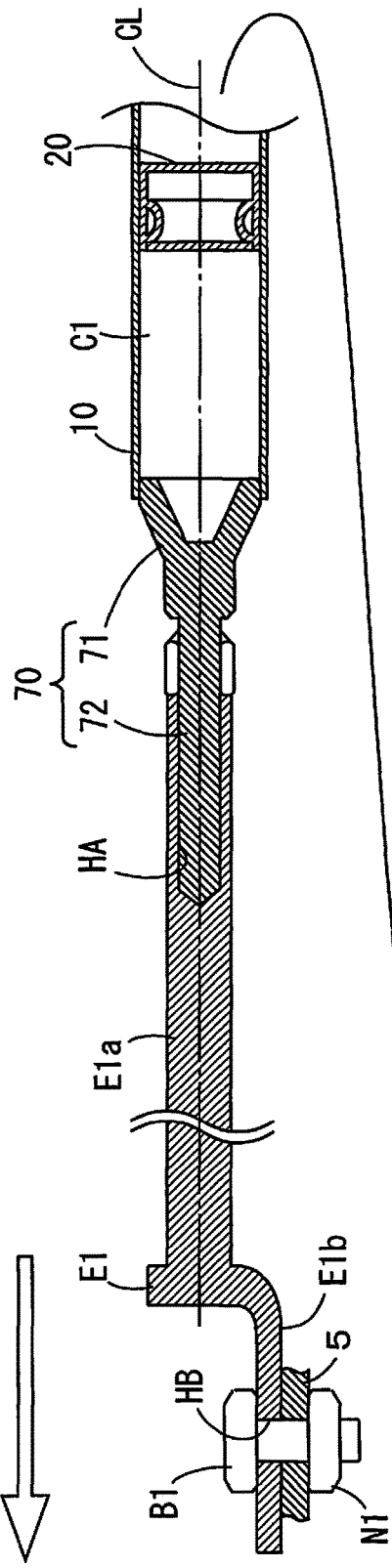
FIG. 3 is a cross sectional view of the reinforcing member.
Figure 3:
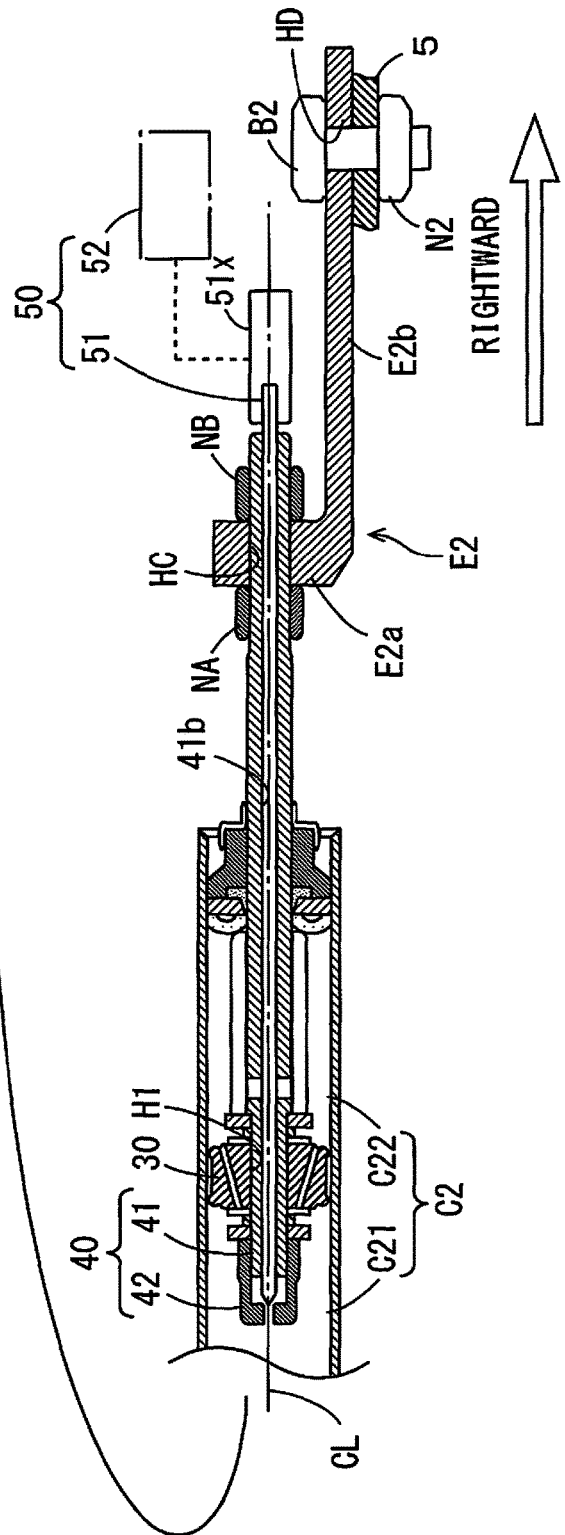

FIG. 2 is a diagram showing the appearance of the reinforcing member 100. FIG. 3 is a cross sectional view of the reinforcing member 100. As shown in FIG. 2, the reinforcing member 100 includes a cylinder 10. The cylinder 10 is coupled to one main frame 5 (FIG. 3) via a coupling E1. A piston rod 40 projects from the cylinder 10. The piston rod 40 is coupled to the other main frame 5 (FIG. 3) via a coupling E2.

Hereinafter, a straight line coinciding with an axial center of the cylinder 10 is referred to as an axial center line CL, and a direction parallel or substantially parallel to the axial center line CL is referred to as an axial direction. Further, a direction directed from one end towards the other end of the cylinder 10 is conveniently referred to as rightward, and a direction directed from the other end towards the one end of the cylinder 10 is conveniently referred to as leftward.

As shown in FIG. 3, the reinforcing member 100 includes pistons 20, 30 and an adjuster 50. The pistons 20, 30 are respectively movable in the axial direction in the cylinder 10. The inside of the cylinder 10 is sectioned into a gas chamber C1 and a main liquid chamber C2 by the piston 20. The gas chamber C1 is located farther leftward than the piston 20, and the main liquid chamber C2 is located farther rightward than the piston 20. The piston 30 is located farther rightward than the piston 20. The main liquid chamber C2 is further sectioned into a sub-liquid chamber C21 and a sub-liquid chamber C22 by the piston 30. The sub-liquid chamber 21 is located farther leftward than the piston 30, and the sub-liquid chamber C22 is located farther rightward than the piston 30. A through hole H1 is provided in the piston 30 to extend along the axial center line CL.

Gas is sealed in the gas chamber C1, and liquid is sealed in the sub-liquid chambers C21, C22. The gas sealed in the gas chamber C1 is preferably nitrogen, for example. Further, in the present example, oil is sealed in the sub-liquid chambers C21, C22 as the liquid.

A closing member 70 is attached to the left end of the cylinder 10. The closing member 70 includes a closure 71 and a male screw 72. The closure 71 closes the left end of the cylinder 10. The male screw 72 extends leftward along the axial center line CL from the closure 71.

The coupling E1 includes an extending portion E1a and a fixing portion E1b. The extending portion E1a preferably has an elongated shape and extends in the axial direction. The fixing portion E1b preferably has an L-shaped cross section and is provided at the left end of the extending portion E1a. A screw hole HA having a certain depth extends in the axial direction from the right end of the extending portion E1a. The male screw 72 of the closing member 70 is screwed into the screw hole HA so that the coupling E1 is fixed to the closing member 70. A bolt hole HB is provided in the fixing portion E1b. A bolt B1 is inserted into the bolt hole HB, and a nut N1 is attached to a tip end of the bolt B1. Thus, the coupling E1 is fixed to the one main frame 5.

The piston rod 40 includes a cylindrical rod 41 extending in the axial direction and a cap nut 42. The rod 41 is inserted into the through hole H1 of the piston 30 and extends in the axial direction to the outside of the cylinder 10 through the sub-liquid chamber C22. An axial center of the rod 41 coincides with the axial center line CL. A movement path 41b extending in the axial direction is provided in the rod 41. The left end of the rod 41 projects from one surface of the piston 30 to the sub-liquid chamber C21. The cap nut 42 is attached to the left end of the rod 41.

The adjuster 50 includes an elongated adjusting rod 51 and a rotator 52. The adjusting rod 51 is movably inserted into the movement path 41b of the rod 41. An axial center of the adjusting rod 51 coincides with the axial center line CL.

The right end of the adjusting rod 51 projects from the right end of the piston rod 40. The rotator 52 is attached to the right end of the adjusting rod 51 via an attachment portion 51x. The rotator 52 moves the adjusting rod 51 in the axial direction. Details of the rotator 52 will be described below.

The coupling E2 includes an attachment portion E2a and an extending portion E2b. An insertion hole HC is provided in the attachment portion E2a. The rod 41 is inserted into the insertion hole HC. Nuts NA, NB are attached to the rod 41 to hold the coupling E2 therebetween. Thus, the coupling E2 is fixed to an outer peripheral surface of the rod 41. The extending portion E2b is offset from the axial center line CL and extends in the axial direction. A bolt hole HD is provided in the extending portion E2b. A bolt B2 is inserted into the bolt hole HD, and a nut N2 is attached to a tip end of the bolt B2. Thus, the coupling E2 is fixed to the other main frame 5.

Figure 4:
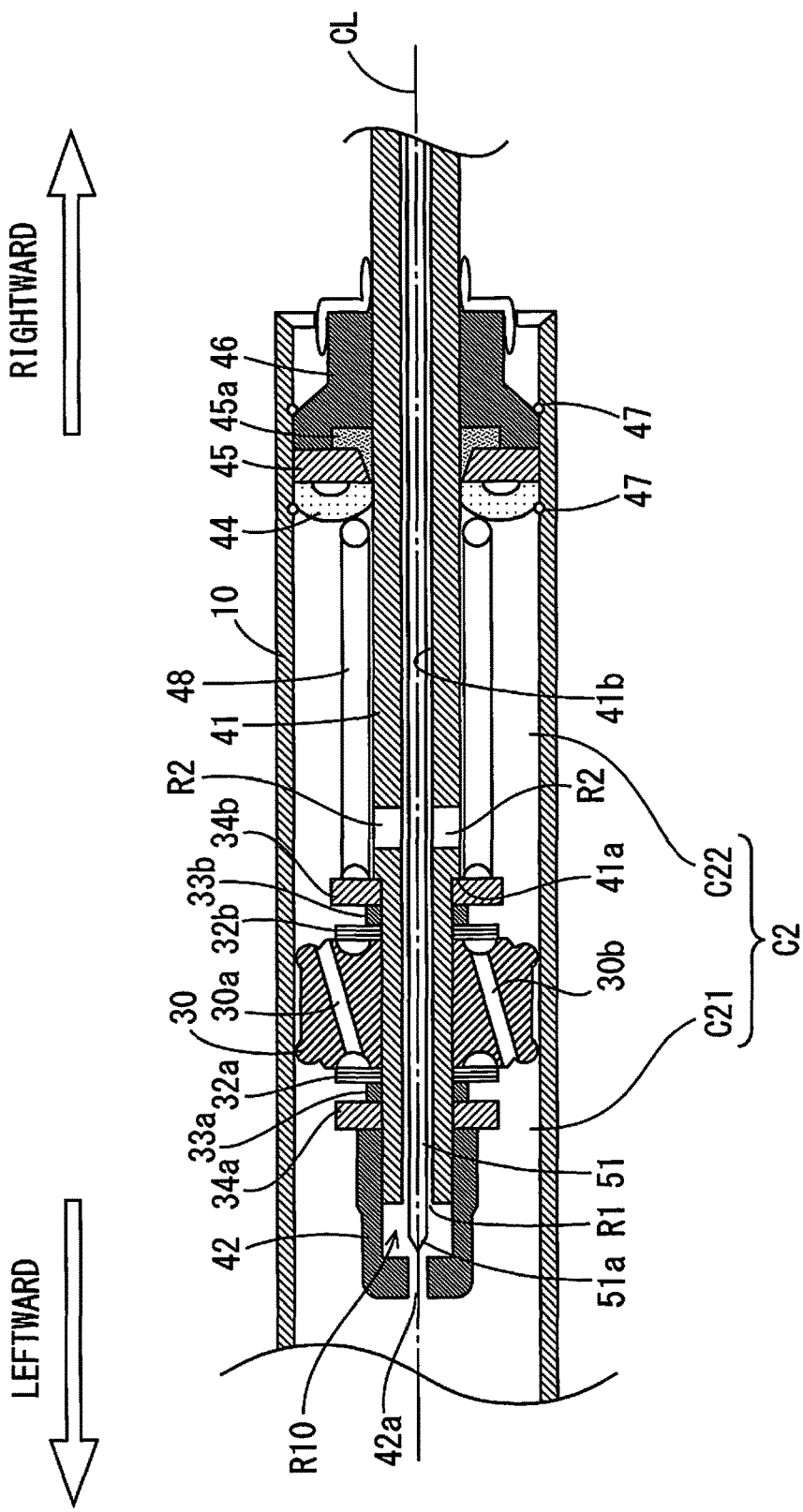
FIG. 4 is an enlarged cross sectional view showing the inside of a cylinder.

FIG. 4 is an enlarged cross sectional view showing the inside of the cylinder 10. As shown in FIG. 4, a plurality of communication holes 30a and a plurality of communication holes 30b that connect the sub-liquid chamber C21 to the sub-liquid chamber C22 are provided in the piston 30. In FIG. 4, only one communication hole 30a and one communication hole 30b are shown. The communication hole 30a extends from a left surface towards a right surface of the piston 30 to gradually approach an inner peripheral surface of the cylinder 10. The communication hole 30b extends from the right surface towards the left surface of the piston 30 to gradually approach the inner peripheral surface of the cylinder 10. The left surface of the piston 30 faces the sub-liquid chamber C21, and the right surface of the piston 30 faces the sub-liquid chamber C22.

An annular valve plate 32a is provided on an outer peripheral surface of the rod 41 to abut against the left surface of the piston 30, and an annular valve plate 32b is provided on the outer peripheral surface of the rod 41 to abut against the right surface of the piston 30. The valve plate 32a closes a left end opening of the communication hole 30a. The valve plate 32b closes a right end opening of the communication hole 30b. A left end opening of the communication hole 30b is not closed by the valve plate 32a, and a right end opening of the communication hole 30a is not closed by the valve plate 32b. The valve plates 32a, 32b resist a flow of oil.

An annular spacing member 33a and an annular washer 34a are located to the left of the valve plate 32a. The spacing member 33a abuts against the valve plate 32a, and the washer 34a abuts against the spacing member 33a. An annular spacing member 33b and an annular washer 34b are located to the right of the valve plate 32b. The spacing member 33b abuts against the valve plate 32b, and the washer 34b abuts against the spacing member 33b. Outer diameters of the spacing members 33a, 33b are respectively smaller than outer diameters of the valve plates 32a, 32b, and are respectively smaller than outer diameters of the washers 34a, 34b.

A step 41a is provided at a portion of the outer peripheral surface of the rod 41 located in the sub-liquid chamber C22. The washer 34b abuts against the step 41a. Thus, the rightward movement of the washer 34b is restricted. When the cap nut 42 is fastened, the piston 30, the valve plates 32a, 32b, the spacing members 33a, 33b, and the washers 34a, 34b are fixed to the rod 41.

In the vicinity of the right end of the cylinder 10, an annular pressing member 44, annular seals 45, 45a and a substantially cylindrical closing member 46 are located between the inner peripheral surface of the cylinder 10 and the outer peripheral surface of the rod 41. The seals 45, 45a overlap with each other, and the pressing member 44 and the closing member 46 are respectively located to the left and right of the seals 45, 45a to hold the seals 45, 45a therebetween in the axial direction. A pair of positioning rings 47 are attached to the inner peripheral surface of the cylinder 10. The pressing member 44 and the closing member 46 are positioned with respect to the cylinder 10 by the positioning rings 47 while pressing the seals 45, 45a. The seals 45, 45a are preferably elastic members made of rubber or the like, and adhere to the inner peripheral surface of the cylinder 10 and the outer peripheral surface of the rod 41 by being pressed by the pressing member 44 and the closing member 46. Thus, the main liquid chamber C2 is sealed fluid-tight. The pressing member 44, the seal 45, and the closing member 46 are fixed to the cylinder 10. The rod 41 is movable in the axial direction with respect to the pressing member 44, the seals 45, 45a, and the closing member 46.

A biasing member 48 extending in the axial direction is provided between the washer 34b and the pressing member 44 to surround the outer peripheral surface of the piston rod 40 (the rod 41). The biasing member 48 biases the piston 30 in the axial direction. Thus, the piston 30 is stably held at an appropriate position in the main liquid chamber C2.

A tapered portion 51a having a diameter that gradually decreases leftward is provided at the left end of the adjusting rod 51. The tapered portion 51a projects from the left end of the rod 41 to the sub-liquid chamber C21. An outer diameter of the adjusting rod 51 is smaller than an inner diameter of the rod 41. Therefore, a communication path R1 is provided between the inner peripheral surface of the movement path 41b and the outer peripheral surface of the adjusting rod 51. A plurality of communication openings R2 that connect the communication path R1 to the sub-liquid chamber C22 are provided in the rod 41.

A communication hole 42a extending along the axial center line CL is provided in the cap nut 42. An inner diameter of the communication hole 42a is smaller than the outer diameter of the adjusting rod 51. In this manner, a communication path R10 including the communication hole 42a, the communication path R1, and the communication opening R2 is provided in the piston rod 40. The sub-liquid chamber C21 and the sub-liquid chamber C22 communicate with each other through the communication path R10.

Figure 5:
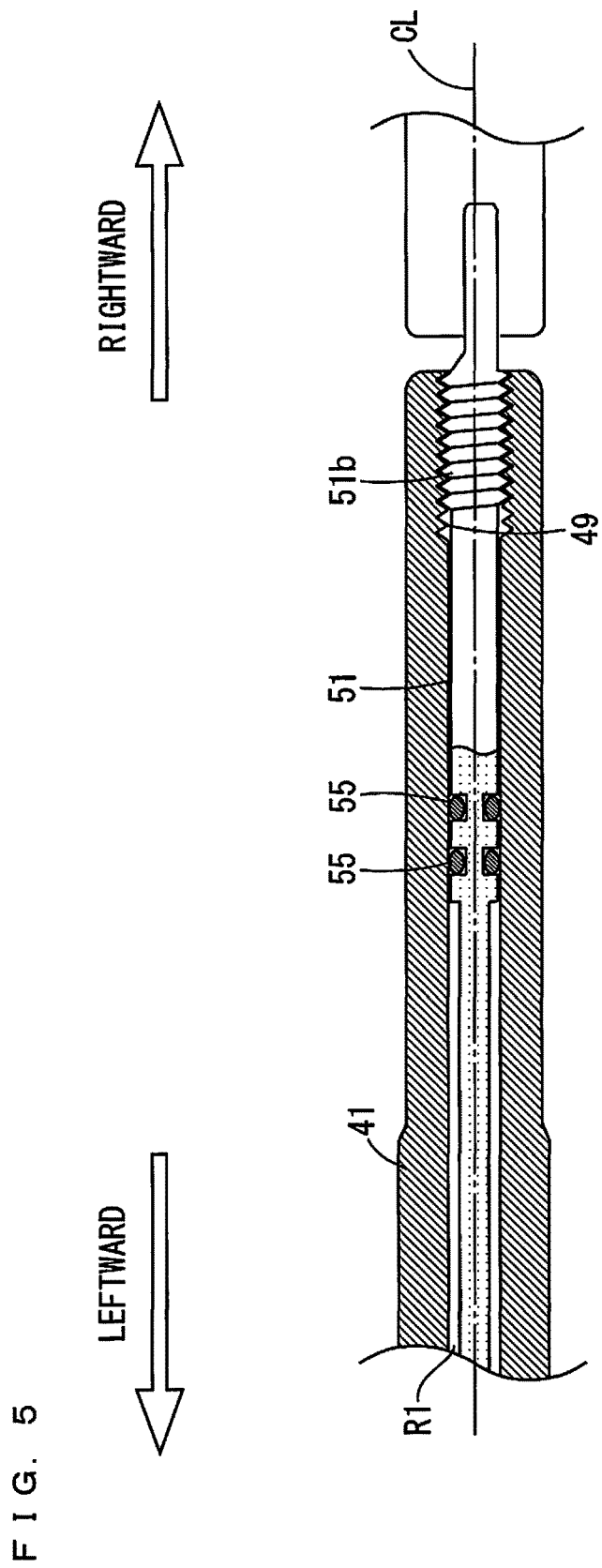
FIG. 5 is an enlarged cross sectional view of portions of a rod and an adjusting rod located outside of the cylinder.

FIG. 5 is an enlarged cross sectional view of portions of the rod 41 and the adjusting rod 51 located outside of the cylinder 10. As shown in FIG. 5, outside of the cylinder 10, a pair of annular seals 55 are attached to the outer peripheral surface of the adjusting rod 51. Each seal 55 adheres to the outer peripheral surface of the adjusting rod 51 and the inner peripheral surface of the rod 41. Thus, the communication path R1 is sealed fluid-tight.

A screw thread 49 is provided on an inner peripheral surface of the right end of the rod 41. Further, a screw thread 51b corresponding to the screw thread 49 is provided on the outer peripheral surface of the adjusting rod 51. The screw thread 51b of the adjusting rod 51 engages with the screw thread 49 of the rod 41. A range in which the screw thread 49 extends in the axial direction is larger than a range in which the screw thread 51b extends in the axial direction by a certain length. A driver includes the screw threads 49, 51b and the rotator 52 shown in FIG. 3. The adjusting rod 51 is rotated by the rotator 52 about the axial center line CL with respect to the piston rod 40, such that the adjusting rod 51 is moved in the axial direction with respect to the piston rod 40. A direction in which the adjusting rod 51 is moved depends on a direction in which the adjusting rod 51 is rotated. Further, a range in which the adjusting rod 51 is able to be moved depends on the range in which the screw thread 49 is provided. In the present example, the length of the range in which the adjusting rod 51 is able to be moved is about 1 mm, for example.

The function of the reinforcing member 100 will be described. When a force in the axial direction is applied to the reinforcing member 100 from the pair of main frames 5 shown in FIG. 1, the piston 30 is moved in the axial direction in the cylinder 10. Thus, the reinforcing member 100 extends and contracts.

Figure 6:
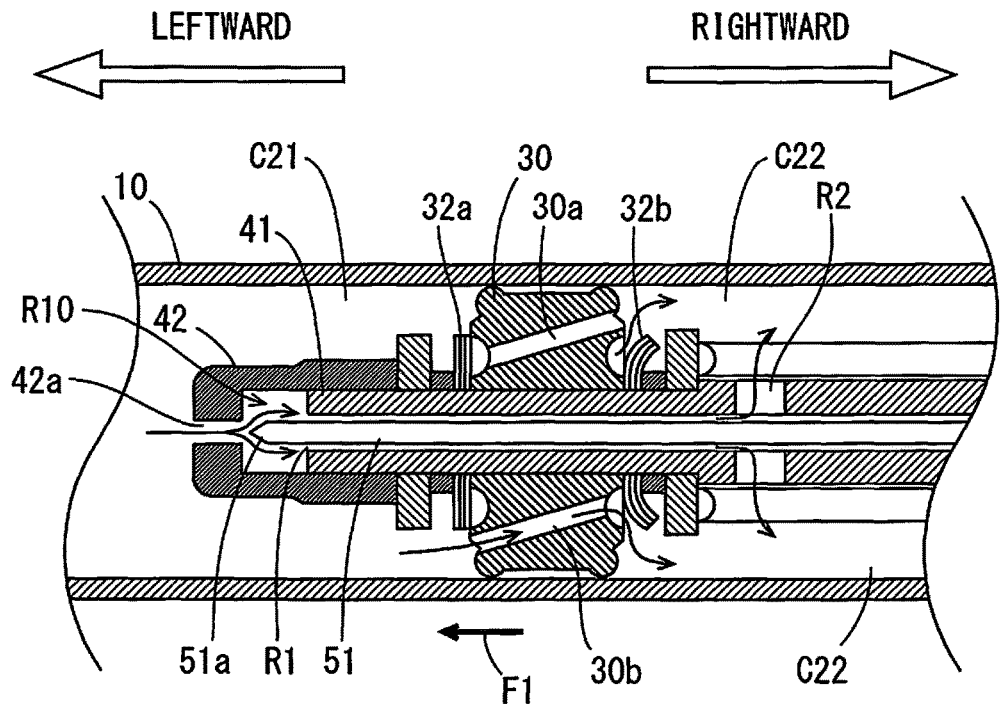
FIG. 6 is a diagram for explaining movement of a piston in the cylinder.
Figure 7:
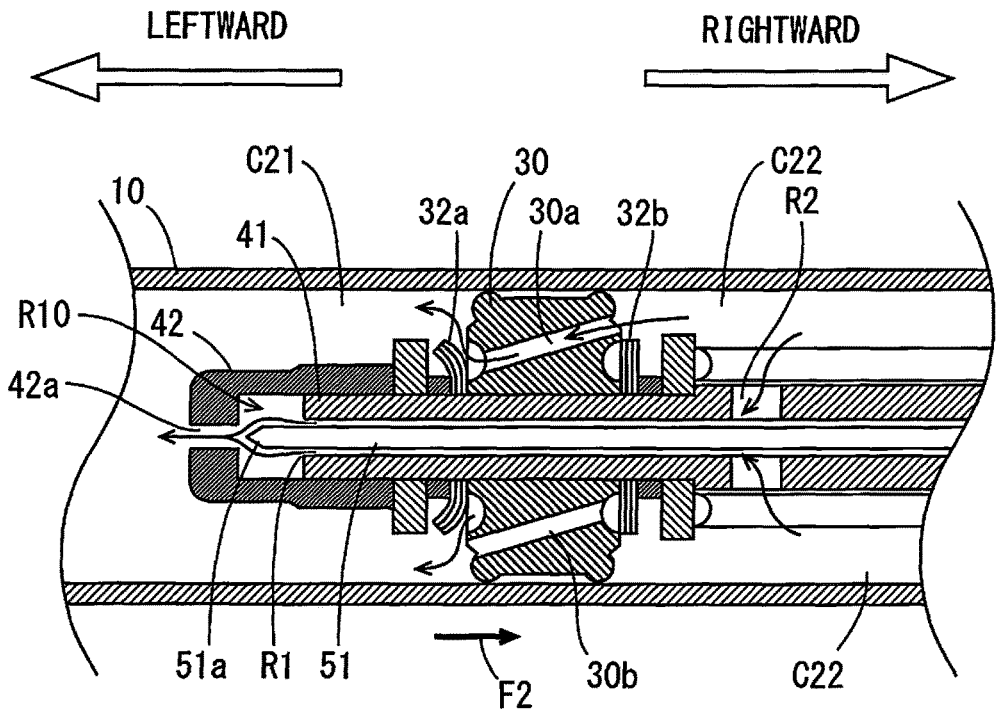
FIG. 7 is a diagram for explaining the movement of the piston in the cylinder.

FIGS. 6 and 7 are diagrams for explaining the movement of the piston 30 in the cylinder 10. FIG. 6 shows the movement of the piston 30 when the reinforcing member 100 contracts. FIG. 7 shows the movement of the piston 30 when the reinforcing member 100 extends.

In the example shown in FIG. 6, a leftward force F1 is applied to the piston 30. In this case, the piston 30 is moved leftward with respect to the cylinder 10, and oil flows from the sub-liquid chamber C21 to the sub-liquid chamber C22.

Specifically, an oil pressure in the sub-liquid chamber C21 is higher than an oil pressure in the sub-liquid chamber C22, so that the oil flows from the sub-liquid chamber C21 to the sub-liquid chamber C22 through the communication path R10 (the communication hole 42a, the communication path R1, and the communication opening R2) of the piston rod 40. Further, an outer periphery of the valve plate 32b is bent rightward, and the right end opening of the communication hole 30b is opened. Thus, the oil flows from the sub-liquid chamber C21 to the sub-liquid chamber C22 through the communication hole 30b. The valve plate 32a is pressed against the left surface of the piston 30 by the oil pressure in the sub-liquid chamber C21. Therefore, the valve plate 32a keeps the left end opening of the communication hole 30a closed.

In the example shown in FIG. 7, when a rightward force F2 is applied to the piston 30, the piston 30 is moved rightward with respect to the cylinder 10, and the oil flows from the sub-liquid chamber C22 to the sub-liquid chamber C21.

Specifically, the oil pressure in the sub-liquid chamber C22 is higher than the oil pressure in the sub-liquid chamber C21. Therefore, the oil flows from the sub-liquid chamber C21 to the sub-liquid chamber C22 through the communication path R10 of the piston rod 40. Further, the valve plate 32a is bent leftward. Therefore, the left end opening of the communication hole 30a is opened. Thus, the oil flows from the sub-liquid chamber C22 to the sub-liquid chamber C21 through the communication hole 30a. The valve plate 32b is pressed against the right surface of the piston 30 by the oil pressure in the sub-liquid chamber C22. Therefore, the valve plate 32b keeps the right end opening of the communication hole 30b closed.

A resistance is exerted on a flow of oil due to the movement of the piston 30. Thus, kinetic energy is converted into thermal energy. As a result, the resistance to the flow of oil is exerted as a damping force, and deformation and vibration of the main frames 5 are significantly reduced or prevented.

The piston 20 shown in FIG. 3 is moved in the axial direction in the cylinder 10 while receiving the pressure of the gas in the gas chamber C1. Thus, a pressure difference between the sub-liquid chamber C21 and the sub-liquid chamber C22 is reduced. Therefore, an occurrence of cavitation in the cylinder 10 is significantly reduced or prevented.

In the present preferred embodiment, the adjusting rod 51 is moved in the axial direction in the movement path 41b of the rod 41 so that a moving amount of oil in the communication path R10 is adjusted. Here, a moving amount of oil means a flow amount of oil per unit time.

Figure 8:
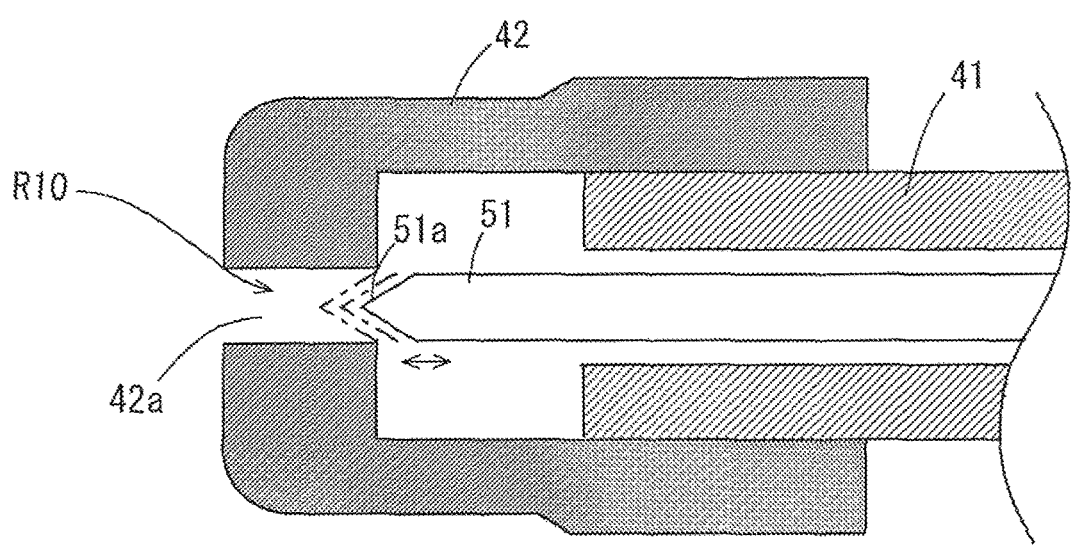
FIG. 8 is a diagram for explaining details of an adjuster.

FIG. 8 is a diagram for explaining the movement of the adjusting rod 51. As shown in FIG. 8, when the adjusting rod 51 is moved in the axial direction, a positional relationship between the communication path R10 and the tapered portion 51a of the adjusting rod 51 is changed. Thus, a cross sectional area (hereinafter referred to as an oil passing area) through which the oil passes in the communication path R10 is changed. Thus, a moving amount of oil in the communication path R10 is changed.

Specifically, when a position of the tip end of the tapered portion 51a in the communication hole 42a of the cap nut 42 is changed, the oil passing area in the communication hole 42 is changed. The oil passing area in the communication hole 42a gradually decreases as the adjusting rod 51 is moved leftward with respect to the rod 41. As the oil passing area decreases, the resistance to the flow of oil increases, and the damping force increases.

In this manner, the communication hole 42a is provided in the cap nut 42, and the adjusting rod 51 inserted into the movement path 41b of the rod 41 is moved such that the damping force of the reinforcing member 100 is adjusted with a simple and compact structure. Further, because the tapered portion 51a having a diameter that gradually decreases is provided at the left end of the adjusting rod 51, a cross sectional area through which the oil passes is gradually changed with the movement of the adjusting rod 51. Thus, the moving amount of oil in the communication path R10 is finely adjusted.

Figure 9:
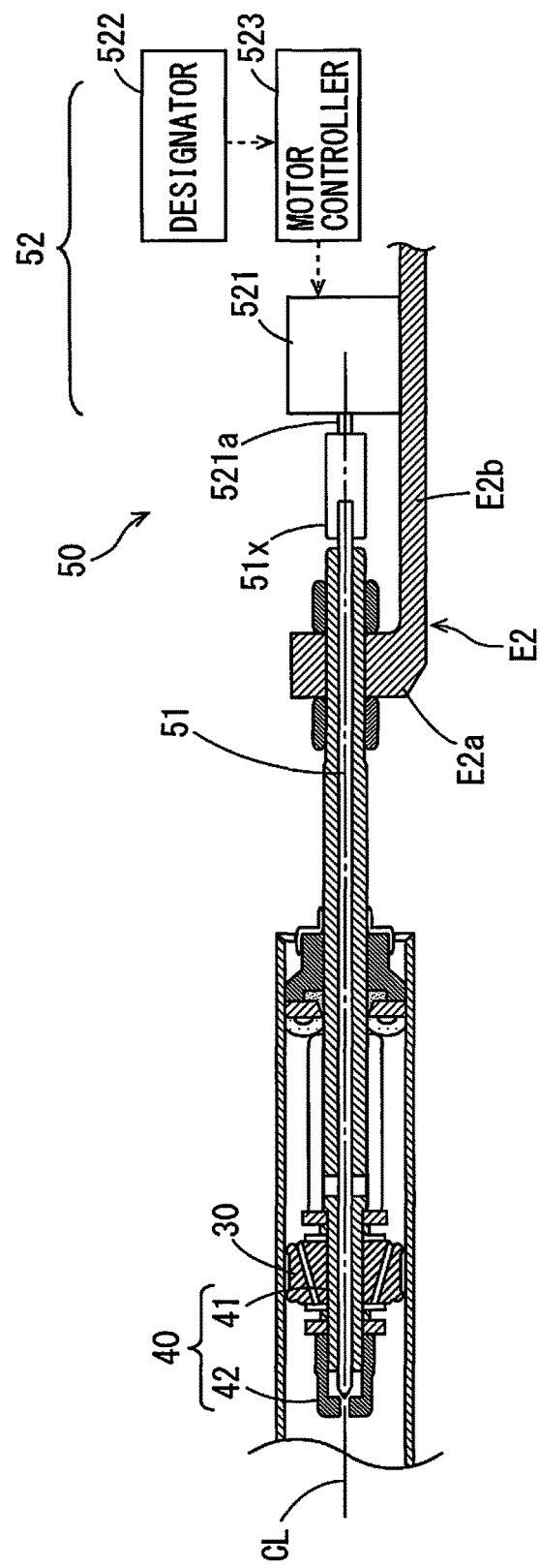
FIG. 9 is a diagram for explaining a specific example of a rotator.
Figure 10:
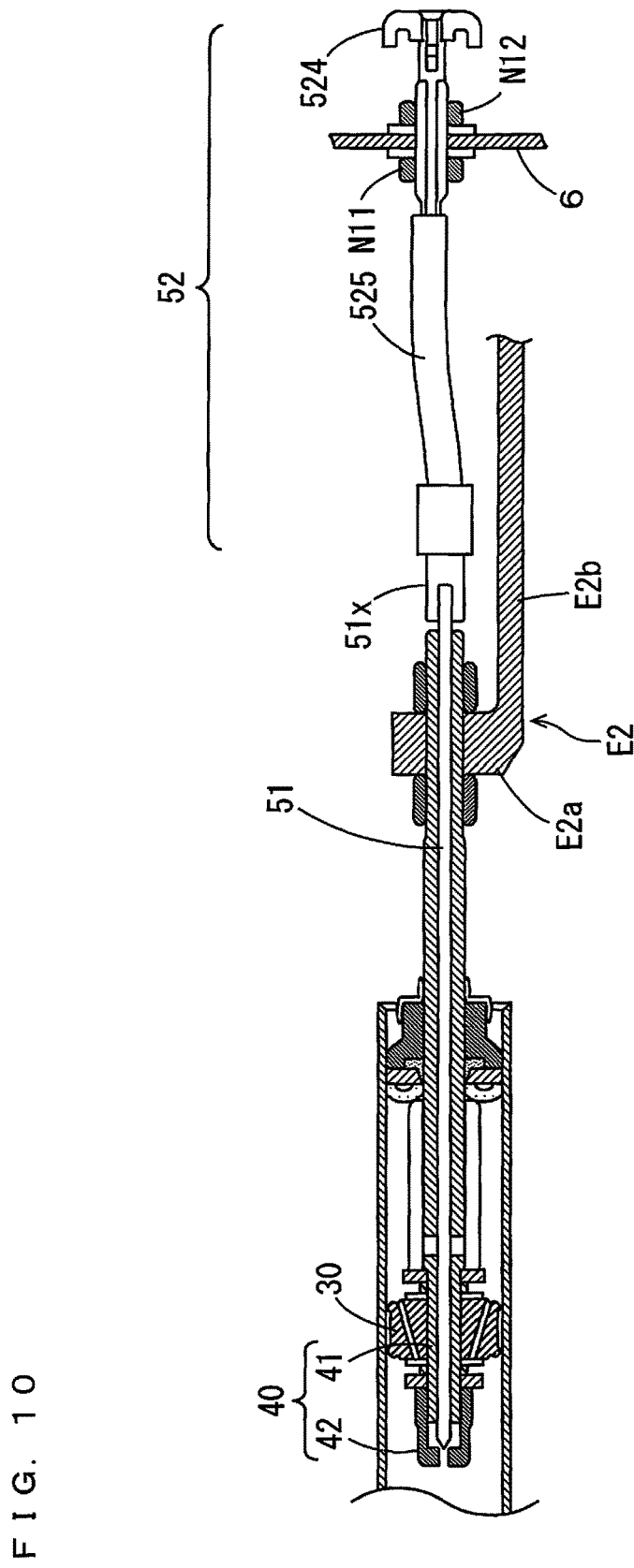
FIG. 10 is a diagram for explaining a specific example of the rotator.

FIGS. 9 and 10 are diagrams for explaining a specific example of the rotator 52. In the example shown in FIG. 9, the rotator 52 includes a motor 521, a designator 522, and a motor controller 523. The motor 521 is fixed to the extending portion E2b of the coupling E2 on the axial center line CL. A rotation shaft 521a of the motor 521 is coupled to the right end of the adjusting rod 51 via an attachment portion 51x. The designator 522 is operated by a driver, a maintenance operator or the like to designate a moving direction and a moving amount of the adjusting rod 51. The motor controller 523 controls the rotating direction and the rotating amount of the motor 521 based on the operation of the designator 522. Thus, the adjusting rod 51 is arbitrarily moved rightward and leftward. As a result, the damping force of the reinforcing member 100 is arbitrarily adjusted.

In the present example, because the extending portion E2b of the coupling E2 is offset from the axial center of the rod 41, a space is provided on an extending line of the rod 41. Because it is possible to attach the motor 521 to the adjusting rod 51 by utilizing the space, the structure of the adjuster 50 is simplified.

The motor 521 may be located at another position of the vehicle body 3 instead of being located on the coupling E2. In this case, the rotation shaft 521a of the motor 521 is connected to the adjusting rod 51 via a flexible connector, for example, and the rotation of the rotation shaft 521a is transmitted to the adjusting rod 51 via the connector. Further, the motor controller 523 may control the motor 521 based on a signal from another electronic appliance such as a sensor instead of controlling the motor 521 based on the operation of the designator 522.

In the example shown in FIG. 10, the rotator 52 includes an adjustment knob 524. The adjustment knob 524 is attached to a predetermined position of the outer frame 6 by nuts N11, N12, for example, to be exposed to the outside of the outer frame 6. The adjustment knob 524 is connected to the adjusting rod 51 via the flexible connector 525. The driver, the maintenance operator or the like holds and rotates the adjustment knob 524. The rotation of the adjustment knob 524 is transmitted to the adjusting rod 51 via the connector 525. Thus, the adjusting rod 51 is arbitrarily moved rightward and leftward. As a result, the driver, the maintenance operator or the like is able to easily and manually adjust the damping force of the reinforcing member 100.

A distance between the seal 55 and the screw thread 51b provided on the outer peripheral surface of the adjusting rod 51 in the axial direction is preferably larger than a length of the screw thread 49 provided on the movement path 41b of the rod 41 in the axial direction. FIGS. 11A, 11B, 12A and 12B are diagrams for explaining the distance between the seal 55 and the screw thread 51b.

In the example shown in FIG. 11A, the distance L1 between the seal 55 and the screw thread 51b in the axial direction is smaller than the length L2 of the screw thread 49 of the rod 41 in the axial direction.

During assembly of the reinforcing member 100, the adjusting rod 51 is inserted into the movement path 41b from the right end of the rod 41. When the left end of the screw thread 51b of the adjusting rod 51 reaches the right end of the screw thread 49 of the rod 41, the adjusting rod 51 is rotated with respect to the rod 41, and the screw thread 51b engages with the screw thread 49.

As shown in FIG. 11B, in the case where the distance L1 is smaller than the length L2, when the left end of the screw thread 51b reaches the right end of the screw thread 49, at least the right seal 55 is in contact with the screw thread 49. When the adjusting rod 51 is rotated with respect to the rod 41 in this state, the seal 55 may be damaged by the screw thread 49.

In contrast, in the example shown in FIG. 12A, the distance L1 between the seal 55 and the screw thread 51b in the axial direction is larger than the length L2 of the screw thread 49 of the rod 41 in the axial direction. In this case, as shown in FIG. 12B, when the left end of the screw thread 51b reaches the right end of the screw thread 49, the seal 55 is located at a position farther leftward than the left end of the screw thread 49. Therefore, the adjusting rod 51 is not rotated with respect to the rod 41 with the seal 55 in contact with the screw thread 49. Therefore, the seal 55 is prevented from being damaged by the screw thread 49.

In the reinforcing member 100 according to the present preferred embodiment, the force in the axial direction is exerted on the piston 30 in the cylinder 10 by the deformation or vibration of the main frames 5. Thus, the piston 30 is moved in the axial direction in the cylinder 10, and the oil flows between the sub-liquid chamber C21 and the sub-liquid chamber C22 through the communication path R10. In this case, a damping force is generated by the flow of oil, and deformation and vibration of the main frames 5 are significantly reduced or prevented. Further, the piston 20 is moved in the axial direction while receiving the pressure of the gas in the gas chamber C1. Thus, a pressure difference between the sub-liquid chamber C21 and the sub-liquid chamber C22 is reduced, and an occurrence of cavitation is significantly reduced or prevented.

Further, a moving amount of oil in the communication path R10 is adjusted by the adjuster 50 so that a moving load through the piston 30 is adjusted. Thus, the damping force of the reinforcing member 100 is adjusted to be suitable for a size of the vehicle body 3 and the environment in which the vehicle is used. Therefore, flexibility of the reinforcing member 100 is enhanced.

Further, in the present preferred embodiment, a cross sectional area through which the oil passes in the communication path R10 is changed, so that a moving amount of oil in the communication path R10 is adjusted. Thus, a damping force of the reinforcing member 100 is adjusted with a simple structure.

Further, in the present preferred embodiment, the adjusting rod 51 is rotated with the screw thread 49 provided on the inner surface of the rod 41 engaging with the screw thread 51b provided on the outer surface of the adjusting rod 51. Therefore, the adjusting rod 51 is moved in the axial direction in the movement path 41b of the rod 41. Thus, a cross sectional area through which the oil passes is changed with a simple structure. Further, the right end of the adjusting rod 51 projects from the movement path 41b of the rod 41 so that the rotator 52 is easily attached to the adjusting rod 51.

In the above-described preferred embodiments, the tapered portion 51a is provided at the tip end of the adjusting rod 51. However, if the oil passing area in the communication path R10 is changed, the adjusting rod 51 may have another shape. For example, a diameter of the tip end of the adjusting rod 51 may decrease in steps.

In the above-described preferred embodiments, the communication hole 42a is provided in the cap nut 42, and the oil passing area in the communication hole 42a is changed such that a moving amount of oil in the communication path R10 is adjusted. However, the moving amount of oil in the communication path R10 may be adjusted by another structure. For example, an opening through which the tip end of the adjusting rod 51 is inserted may be provided in the movement path 41b of the rod 41, and the moving amount of oil in the communication path R10 may be adjusted by the change of the oil passing area in the opening. Further, a moving amount of oil in the communication holes 30a, 30b of the piston 30 may be adjusted.

While the adjusting rod 51 is moved in the axial direction by being rotated by the rotator 52 in the above-described preferred embodiments, the adjusting rod 51 may be moved by another structure. For example, a sliding mechanism that allows the adjusting rod 51 to slide in the axial direction without rotating the adjusting rod 51 may be provided.

While the cylinder 10 and the piston rod 40 are respectively coupled to the vehicle body 3 via the couplings E1, E2 in the above-described preferred embodiments, at least one of the cylinder 10 and the piston rod 40 may be directly coupled to the vehicle body 3 without another member.

While the reinforcing member 100 is attached to the pair of main frames 5 in the above-described preferred embodiments, the reinforcing member 100 may be attached to another portion of the vehicle body 3. For example, the reinforcing member 100 may be provided between two locations of the bumper of the outer frame 6 of the vehicle body 3.

While the reinforcing member 100 is preferably provided in a four-wheeled automobile in the above-described preferred embodiments, the reinforcing member 100 may be provided in another vehicle such as a three-wheeled vehicle, a motorcycle, an ATV (All Terrain Vehicle) or the like.

In the following paragraphs, non-limiting examples of correspondences between various elements recited in the claims below and those described above with respect to various preferred embodiments of the present invention are explained.

In the above-described preferred embodiments, the vehicle 1 is an example of a vehicle, the vehicle body 3 is an example of a vehicle body, the reinforcing member 100 is an example of a vehicle reinforcing member, the cylinder 10 is an example of a cylinder, the piston 20 is an example of a first piston, the gas chamber C1 is an example of a gas chamber, the main liquid chamber C2 is an example of a main liquid chamber, the piston 30 is an example of a second piston, the sub-liquid chamber C21 is an example of a first sub-liquid chamber, the sub-liquid chamber C22 is an example of a second sub-liquid chamber, the piston rod 40 is an example of a piston rod, the adjuster 50 is an example of an adjuster, and the communication path R10 is an example of a communication path.

Further, the adjusting rod 51 is an example of a moving member and an adjusting rod, the tapered portion 51a is an example of an insertion portion, the screw threads 49, 51b and the rotator 52 are examples of a driver, the through hole H1 is an example of a through hole, the rod 41 is an example of a rod, the cap nut 42 is an example of a cap nut, the movement path 41b is an example of a movement path, the communication opening R2 is an example of a communication opening, the communication hole 42a is an example of a communication hole, the screw thread 51b is an example of a first screw thread, the screw thread 49 is an example of a second screw thread, and the rotator 52 is an example of a rotator.

Further, the right end of the adjusting rod 51 is an example of a projecting end, the biasing member 48 is an example of a biasing member, the coupling E2 is an example of a first coupling, the attachment portion E2a is an example of an attachment portion, the extending portion E2b is an example of a first extending portion, the coupling E1 is an example of a second coupling, and the extending portion E1a is an example of a second extending portion.

As each of elements recited in the claims, various other elements having structures or functions described in the claims can be also used.

Preferred embodiments of the present invention can be effectively utilized for various types of vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle reinforcing member for a vehicle body of a vehicle, the vehicle reinforcing member comprising:
   a cylinder;
   a first piston that sections an inside of the cylinder into a gas chamber and a main liquid chamber and is movable in an axial direction in the cylinder;
   a second piston that sections the main liquid chamber into a first sub-liquid chamber and a second sub-liquid chamber and is movable in the axial direction in the cylinder;
   a piston rod coupled to the second piston and extending to an outside of the cylinder through the second sub-liquid chamber; and
   an adjuster that adjusts a moving load through the second piston in the main liquid chamber; wherein
   gas is sealed in the gas chamber, and liquid is sealed in the first and second sub-liquid chambers;
   the piston rod is coupled to a first one of two locations on the vehicle body;
   the cylinder is coupled to a second one of the two locations on the vehicle body;
   at least one of the second piston and the piston rod includes a communication path that connects the first sub-liquid chamber to the second sub-liquid chamber;
   the adjuster adjusts the moving load by adjusting a moving amount of liquid in the communication path;
   the adjuster adjusts the moving amount of the liquid in the communication path by changing a cross sectional area through which the liquid passes in the communication path;
   the adjuster includes:
      a moving member including an insertion portion that is insertable into the communication path; and
      a driver that moves the moving member;
   the driver changes the cross sectional area through which the liquid passes in the communication path by moving the moving member to change a relative positional relationship between the communication path and the insertion portion;
   the second piston includes a through hole extending in the axial direction;
   the piston rod includes:
      a rod inserted into the through hole of the second piston; and
      a cap nut;
   a movement path of the rod extends in the axial direction, and a communication opening connects the movement path to the second sub-liquid chamber;
   a first end of the rod projects into the first sub-liquid chamber;
   the cap nut is attached to the first end of the rod;
   a communication hole in the cap nut connects the first sub-liquid chamber to the movement path of the rod;
   the moving member includes an adjusting rod movably inserted into the movement path of the rod;
   a tip end of the adjusting rod is positioned inside of the cap nut as the insertion portion;
   the communication path includes the communication hole of the cap nut, a clearance between an inner surface of the rod and an outer surface of the adjusting rod, and a communication opening of the rod;
   the driver changes a positional relationship between the communication hole of the cap nut and the insertion portion by moving the adjusting rod relative to the rod;
   the movement path of the rod and the adjusting rod respectively have circular or substantially circular cross-sections; and
   the driver includes:
      a first screw thread on an outer surface of the adjusting rod;
      a second screw thread on an inner surface of the rod and that engages with the first screw thread; and
      a rotator that rotates the adjusting rod and moves the adjusting rod in the movement path of the rod.

2. The vehicle reinforcing member according to claim 1, wherein the insertion portion has a tapered shape.

3. The vehicle reinforcing member according to claim 1, wherein
   the rod is cylindrical or substantially cylindrical and extends in the axial direction;
   the adjusting rod includes a projecting end that projects from a second end of the piston rod; and
   the rotator is attached to the projecting end of the adjusting rod.

4. The vehicle reinforcing member according to claim 1, further comprising a biasing member that biases the second piston in a first direction of the axial direction.

5. A vehicle comprising:
   a vehicle body; and
   the vehicle reinforcing member according to claim 1 attached to a location between the two locations on the vehicle body.

6. A vehicle reinforcing member for a vehicle body of a vehicle, the vehicle reinforcing member comprising:
   a cylinder;
   a first piston that sections an inside of the cylinder into a gas chamber and a main liquid chamber and is movable in an axial direction in the cylinder;
   a second piston that sections the main liquid chamber into a first sub-liquid chamber and a second sub-liquid chamber and is movable in the axial direction in the cylinder;
   a piston rod coupled to the second piston and extending to an outside of the cylinder through the second sub-liquid chamber; and
   an adjuster that adjusts a moving load through the second piston in the main liquid chamber; wherein
   gas is sealed in the gas chamber, and liquid is sealed in the first and second sub-liquid chambers;
   the piston rod is coupled to a first one of two locations on the vehicle body;
   the cylinder is coupled to a second one of the two locations on the vehicle body;
   at least one of the second piston and the piston rod includes a communication path that connects the first sub-liquid chamber to the second sub-liquid chamber; and the adjuster adjusts the moving load by adjusting a moving amount of liquid in the communication path;

a first coupling couples the piston rod to the first one of the two locations on the vehicle body; and the first coupling includes:
- an attachment portion attached to an outer surface of the piston rod outside of the cylinder; and
- a first extending portion that is offset from an extending line of an axial center of the piston rod and extends in the axial direction.

7. The vehicle reinforcing member according to claim 6, further comprising a second coupling that couples the cylinder to the second one of the two locations on the vehicle body; wherein the second coupling includes a second extending portion that extends in the axial direction on an extending line of the piston rod.

8. A vehicle comprising:

a vehicle body; and the vehicle reinforcing member according to claim 6 attached to a location between the two locations on the vehicle body.

\* \* \* \* \*